(12) United States Patent
Duncan

(10) Patent No.: US 7,374,508 B2
(45) Date of Patent: May 20, 2008

(54) ELECTRONIC CONNECTOR ASSEMBLY FOR POWER TRANSMITTING DEVICES

(75) Inventor: Bruce A. Duncan, Clinton Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 11/729,434

(22) Filed: Mar. 28, 2007

(65) Prior Publication Data
US 2007/0173367 A1 Jul. 26, 2007

Related U.S. Application Data

(63) Continuation of application No. 10/958,130, filed on Oct. 4, 2004, now Pat. No. 7,241,243.

(60) Provisional application No. 60/508,923, filed on Oct. 6, 2003.

(51) Int. Cl.
*F16H 48/06* (2006.01)
*G01P 1/02* (2006.01)

(52) U.S. Cl. .................. 475/231; 475/153; 73/493

(58) Field of Classification Search ........... 475/150, 475/153, 154, 220, 230, 231, 198, 199; 74/606 R; 73/493, 494, 431; 340/166, 167, 173, 174, 340/207.2, 207.21
See application file for complete search history.

(56) References Cited

U.S. PATENT DOCUMENTS

| | | | |
|---|---|---|---|
| 3,949,841 A | 4/1976 | Jovick et al. | |
| 4,090,592 A | 5/1978 | Jovick et al. | |
| 4,864,231 A | 9/1989 | Okumura et al. | |
| 5,308,171 A | 5/1994 | Sakamoto | |
| 5,445,574 A * | 8/1995 | Sekiguchi et al. | 475/346 |
| 5,451,868 A | 9/1995 | Lock | |
| 5,486,757 A | 1/1996 | Easley | |
| 5,764,057 A | 6/1998 | Stanevich | |
| 5,998,988 A | 12/1999 | Dickmeyer et al. | |
| 6,133,729 A | 10/2000 | Mierzwinski | |
| 6,165,095 A * | 12/2000 | Till et al. | 475/150 |
| 6,203,464 B1 | 3/2001 | Ishikawa et al. | |
| 6,537,979 B1 | 3/2003 | Kuo et al. | |
| 6,551,209 B2 * | 4/2003 | Cheadle et al. | 475/150 |
| 6,774,623 B2 * | 8/2004 | Palfenier et al. | 324/207.15 |
| 6,788,054 B2 * | 9/2004 | Collins et al. | 324/262 |
| 6,796,404 B1 | 9/2004 | Dick et al. | |
| 6,894,484 B2 | 5/2005 | Takizawa et al. | |
| 2004/0036621 A1* | 2/2004 | Morita et al. | 340/682 |

* cited by examiner

*Primary Examiner*—Roger Pang
(74) *Attorney, Agent, or Firm*—Harness, Dickey & Pierce, P.L.C.

(57) ABSTRACT

A power transmitting device, such as a differential, having a housing, input and output shafts, which are rotatably disposed in the housing, a gear set, one or more actuators and/or one or more sensors disposed within the housing, and a connector having a fitting, a seal member and a locking member. The gear set is operable for transmitting rotary power between the input and output shafts. The fitting has a body that extends through a hole formed in the housing. The body includes a plurality of terminals that are electrically coupled to the at least one electrical components. The seal member is disposed between the fitting and the housing to form a seal therebetween. The locking member engages the body and the housing to retain the fitting to the housing. The fitting facilitates electrical connection of the electrical components within the housing with a wire harness that is external to the housing.

29 Claims, 6 Drawing Sheets

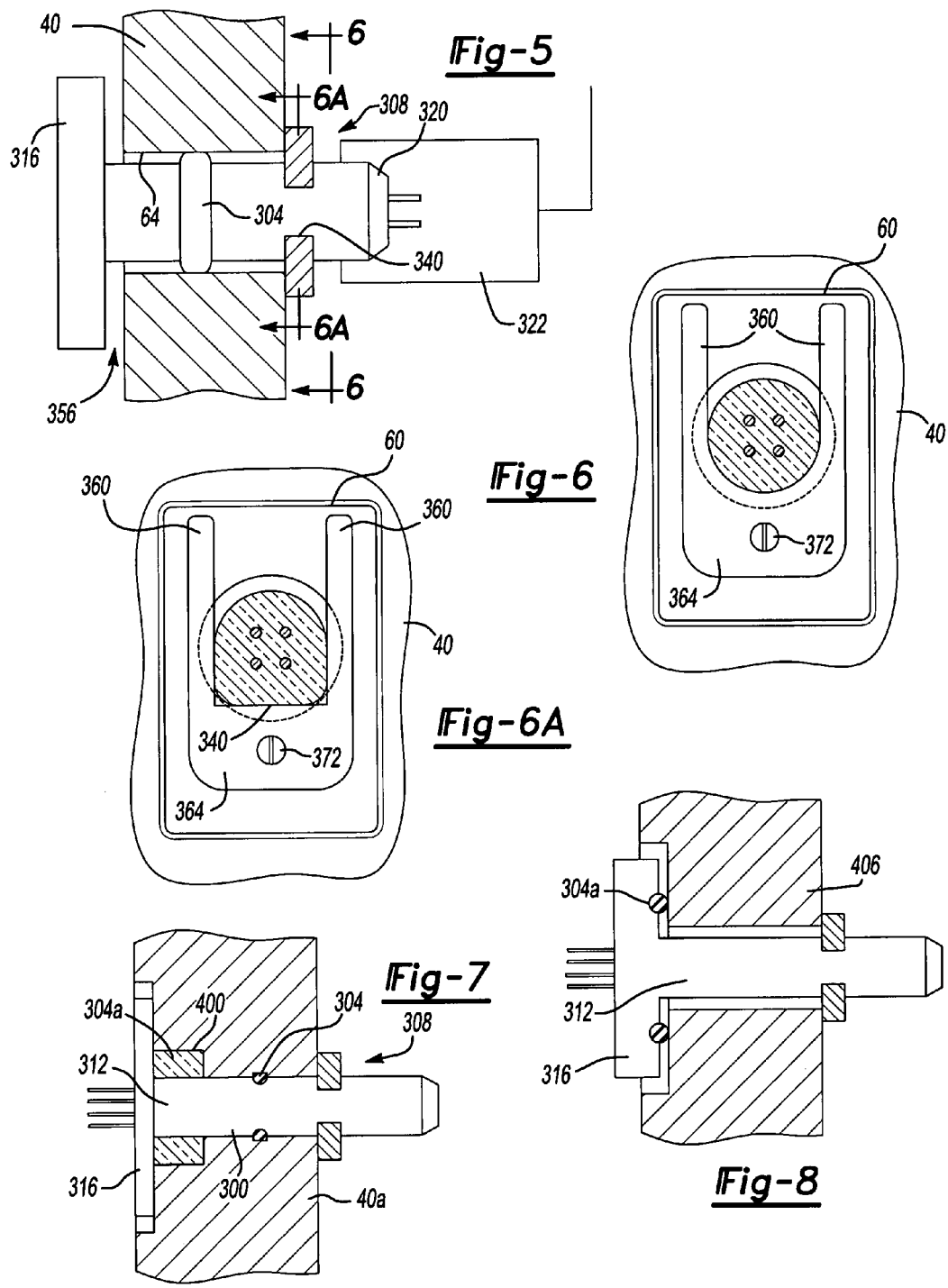

ELECTRONIC CONNECTOR ASSEMBLY FOR POWER TRANSMITTING DEVICES

CROSS-REFERENCE TO RELATED APPLICATIONS

This application is a continuation of U.S. application Ser. No. 10/958,130, filed Oct. 4, 2004, now U.S. Pat. No. 7,241,243, which claims the benefit of U.S. Provisional Application No. 60/508,923, filed on Oct. 6, 2003. The disclosure of the above application is incorporated herein by reference.

FIELD OF THE INVENTION

The present invention generally relates to automotive drivelines and more particularly to a bulkhead connector that facilitates the electronic coupling of sensors and actuators within an enclosed housing to a wire harness located exterior to the housing.

SUMMARY OF THE INVENTION

In one form, the present invention provides a power transmitting device, such as a differential, having a housing, input and output shafts, which are rotatably disposed in the housing, a gear set, one or more actuators and/or one or more sensors disposed within the housing, and a connector having a fitting, a seal member and a locking member. The gear set is operable for transmitting rotary power between the input and output shafts. The fitting has a body that extends through a hole formed in the housing. The body includes a plurality of terminals that are electrically coupled to the at least one electrical components. The seal member is disposed between the fitting and the housing to form a seal therebetween. The locking member engages the body and the housing to retain the fitting to the housing. The fitting facilitates electrical connection of the electrical components within the housing with a wire harness that is external to the housing. The fitting and wire harness may also be keyed to one another to ensure that they may only be assembled in one manner and to prevent the wire harness and fitting from rotating relative to one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 5 is a sectional view of a portion of the rear axle taken longitudinally through the bulkhead connector;

FIG. 6 is a sectional view taken along the line 6-6 of FIG. 5;

FIG. 6A is a sectional view taken along the line 6A-6A of FIG. 5;

FIG. 7 is a sectional view similar to that of FIG. 5 but illustrating the configuration of another bulkhead connector constructed in accordance with the teachings of the present invention;

FIG. 8 is a sectional view similar to that of FIG. 5 but illustrating the configuration of yet another bulkhead connector constructed in accordance with the teachings of the present invention;

DETAILED DESCRIPTION OF THE PREFERRED EMBODIMENTS

Figure 1:
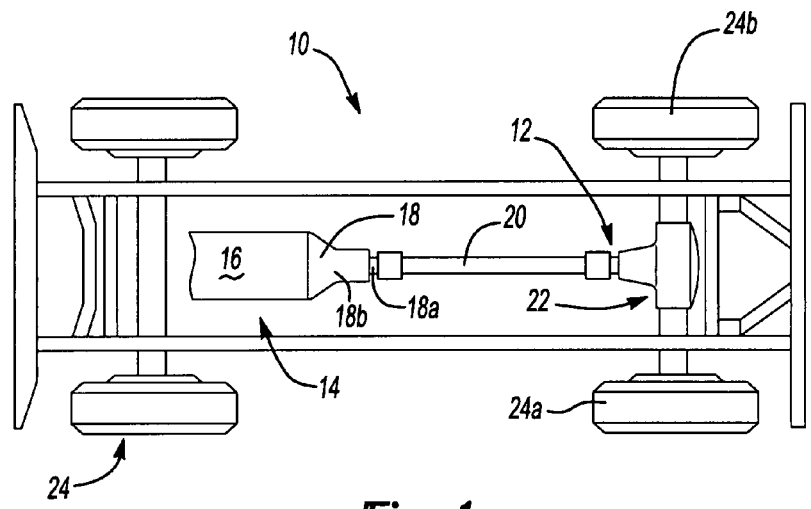
FIG. 1 is a schematic illustration of an exemplary vehicle having an electronic locking differential constructed in accordance with the teachings of the present invention.

With reference to FIG. 1 of the drawings, an exemplary vehicle having a rear axle that is constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a propshaft assembly 20, a rear axle 22 and a plurality of wheels 24. The engine 16 is illustrated in the example provided to be mounted in an in-line or longitudinal orientation along the axis of the vehicle 10 and its output is selectively coupled via a conventional clutch (not shown) to the input of the transmission 18 to transmit rotary power (i.e., drive torque) therebetween. The input of the transmission 18 is commonly aligned with the output of the engine 16 for rotation about a rotary axis. The transmission 18 also includes an output 18a and a gear reduction unit 18b. The gear reduction unit 18b is operable for coupling the transmission input (not shown) to the transmission output 18a at a predetermined gear or speed reduction ratio. The propshaft assembly 20 is coupled for rotation with the output 18a of the transmission 18. Drive torque is transmitted through the propshaft assembly 20 to the rear axle 22 where it is selectively apportioned in a predetermined manner to the left and right rear wheels 24a and 24b, respectively.

Figure 2:
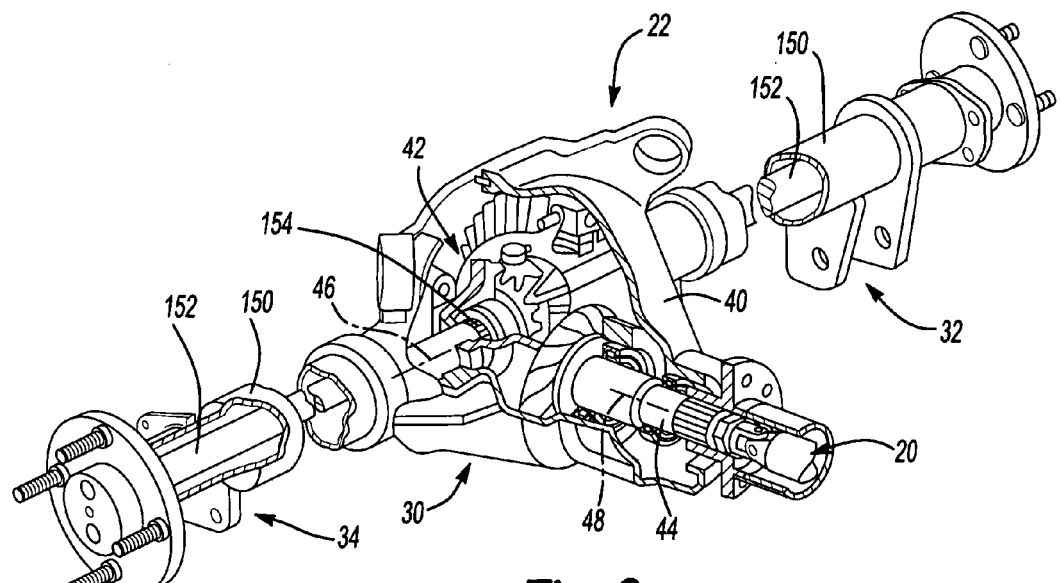
FIG. 2 is a top partially cut-away view of a portion of the vehicle of FIG. 1 illustrating the rear axle and the propshaft in greater detail.
Figure 3A:
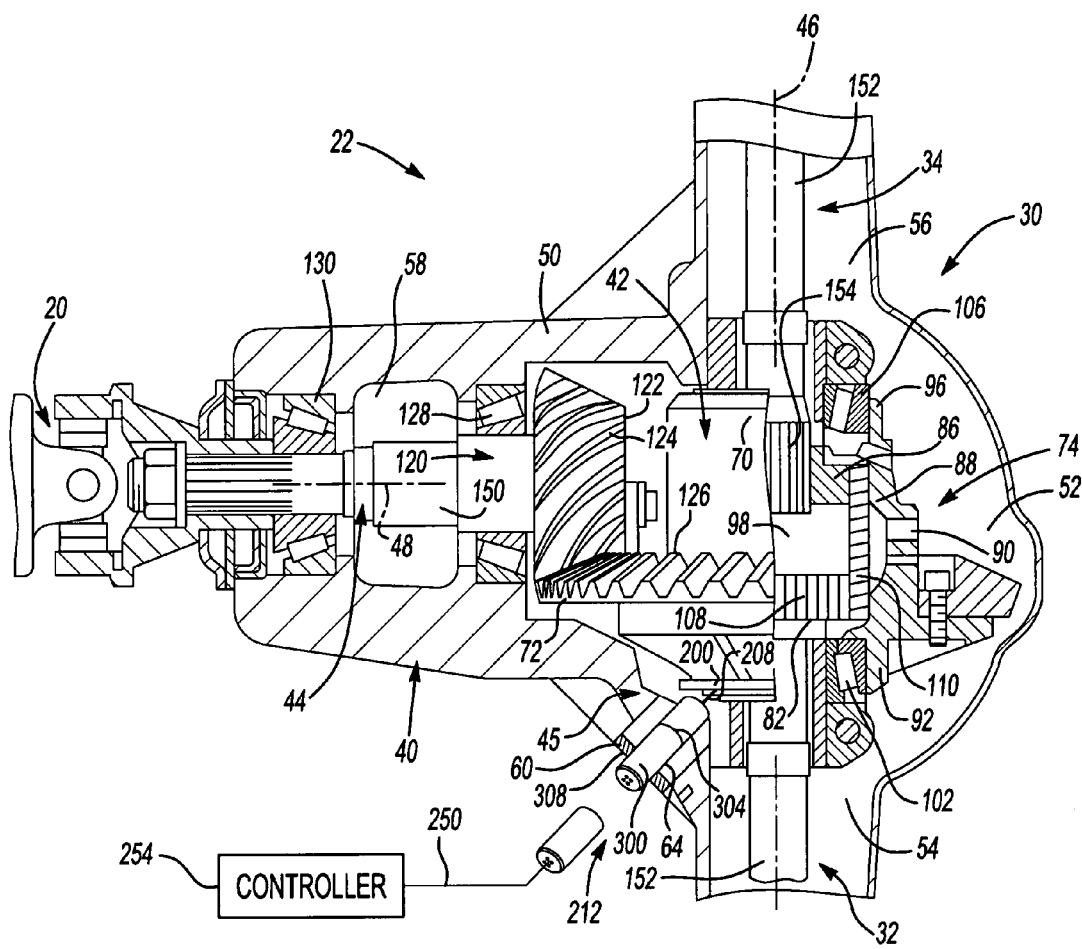
FIG. 3A is a sectional view illustrating the rear axle in greater detail.
Figure 3B:
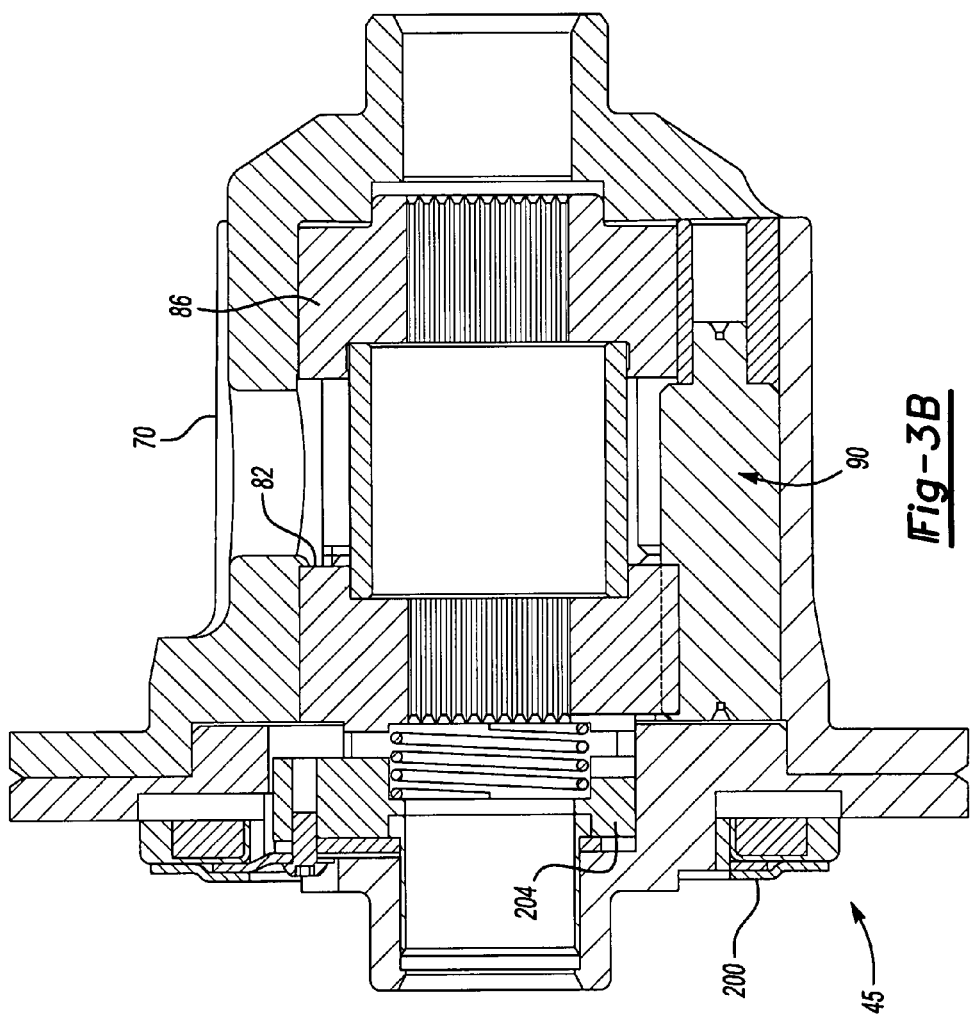
FIG. 3B is a sectional view of a portion of the differential.

With additional reference to FIGS. 2 through 3B, the rear axle 22 is shown to include a differential assembly 30, a left axle shaft assembly 32 and a right axle shaft assembly 34. The differential assembly 30 is an electronic locking differential and for example, may be of the type that is well known in the art and commercially available from various different manufacturers, including American Axle & Manufacturing Company of Detroit, Mich. Two particularly well suited electronic locking differentials are manufactured and marketed by American Axle & Manufacturing Company as the TracRite™ EL and the TracRite™ ECV.

The differential assembly 30 includes a housing 40, a differential unit 42, an input shaft assembly 44, and an electronic actuation system 45. The housing 40 supports the differential unit 42 for rotation about a first axis 46 and further supports the input shaft assembly 44 for rotation about a second axis 48 that is perpendicular to the first axis 46. The housing 40 may be initially formed in a suitable casting process and thereafter machined as required. The housing 40 includes a wall member 50 that defines a central cavity 52 having a left axle aperture 54, a right axle aperture 56, an input shaft aperture 58. The wall member 50 may further define a boss 60 having a through-hole 64 formed therethrough.

The differential unit 42 is disposed within the central cavity 52 of the housing 40 and includes a case 70, a ring gear 72 that is fixed for rotation with the case 70, and a gearset 74 that is disposed within the case 70. The gearset 74 includes first and second side gears 82 and 86 and a plurality of differential pinions 88, which are rotatably supported by brake shoes 90 in a conventional and well known manner. The case 70 includes a pair of trunnions 92 and 96 and defines a gear cavity 98. A pair of bearing assemblies 102 and 106 are shown to support the trunnions 92 and 96, respectively, for rotation about the first axis 46. The left and right axle assemblies 32 and 34 extend through the left and right axle apertures 54 and 56, respectively, where they are coupled for rotation about the first axis 46 with the first and second side gears 82 and 86, respectively. The case 70 is operable for supporting the plurality of differential pinions 88 for rotation within the gear cavity 98 about one or more axes that are perpendicular to the first axis 46. The first and second side gears 82 and 86 each include a plurality of teeth 108 which meshingly engage teeth 110 that are formed on the differential pinions 88.

The input shaft assembly 44 extends through the input shaft aperture 58 where it is supported in the housing 40 for rotation about the second axis 48. The input shaft assembly 44 includes an input shaft 120, a pinion gear 122 having a plurality of pinion teeth 124 that meshingly engage the teeth 126 that are formed on the ring gear 72, and a pair of bearing assemblies 128 and 130 which cooperate with the housing 40 to rotatably support the input shaft 120. The input shaft assembly 44 is coupled for rotation with the propshaft assembly 20 and is operable for transmitting drive torque to the differential unit 42. More specifically, drive torque received the input shaft 120 is transmitted by the pinion teeth 124 to the teeth 126 of the ring gear 72 such that drive torque is distributed through the differential pinions 88 to the first and second side gears 82 and 86.

The left and right axle shaft assemblies 32 and 34 include an axle tube 150 that is fixed to the associated axle aperture 54 and 56, respectively, and an axle half-shaft 152 that is supported for rotation in the axle tube 150 about the first axis 46. Each of the axle half-shafts 152 includes an externally splined portion 154 that meshingly engages a mating internally splined portion (not specifically shown) that is formed into the first and second side gears 82 and 86, respectively.

In the particular embodiment illustrated, the electronic actuation system 45 includes a coil 200, an armature 204, a sensor 208 and a bulkhead connector 212. The coil 200 is mounted in a fixed position relative to the housing 40 and is operable in a first or unenergized condition in which the coil 200 does not generate a magnetic field that is capable of altering or changing the position of the armature 204, and a second or energized condition in which the coil 200 generates a magnetic field that is cable of altering or changing the position of the armature 204. The armature 204 is slidably mounted on the case 70 so as to be positionable in a first position, which permits relative rotation between the case 70 and the first side gear 82, and a second position, which inhibits relative rotation between the case 70 and the first side gear 82. As those skilled in the art will appreciate from this disclosure, the armature 204 may directly lock or unlock the case 70 and the first side gear 82 to one another, or may indirectly cause the locking and unlocking of the case 70 and the first side gear 82 to one another. In configurations where the armature 204 is employed to indirectly lock and unlock the case 70 and the first side gear 82 to one another, devices such as a ball ramp mechanism (not shown) may be employed to translate another element, such as one or more pins (not shown), into engagement with the first side gear 82 (e.g., engagement of the pins to corresponding holes formed in the first side gear 82) to thereby inhibit relative rotation between the case 70 and the first side gear 82. Such arrangements whereby the armature 204 is employed to indirectly lock and unlock the case to a side gear are well known in the art and as such, need not be described in further detail herein.

Figure 4:
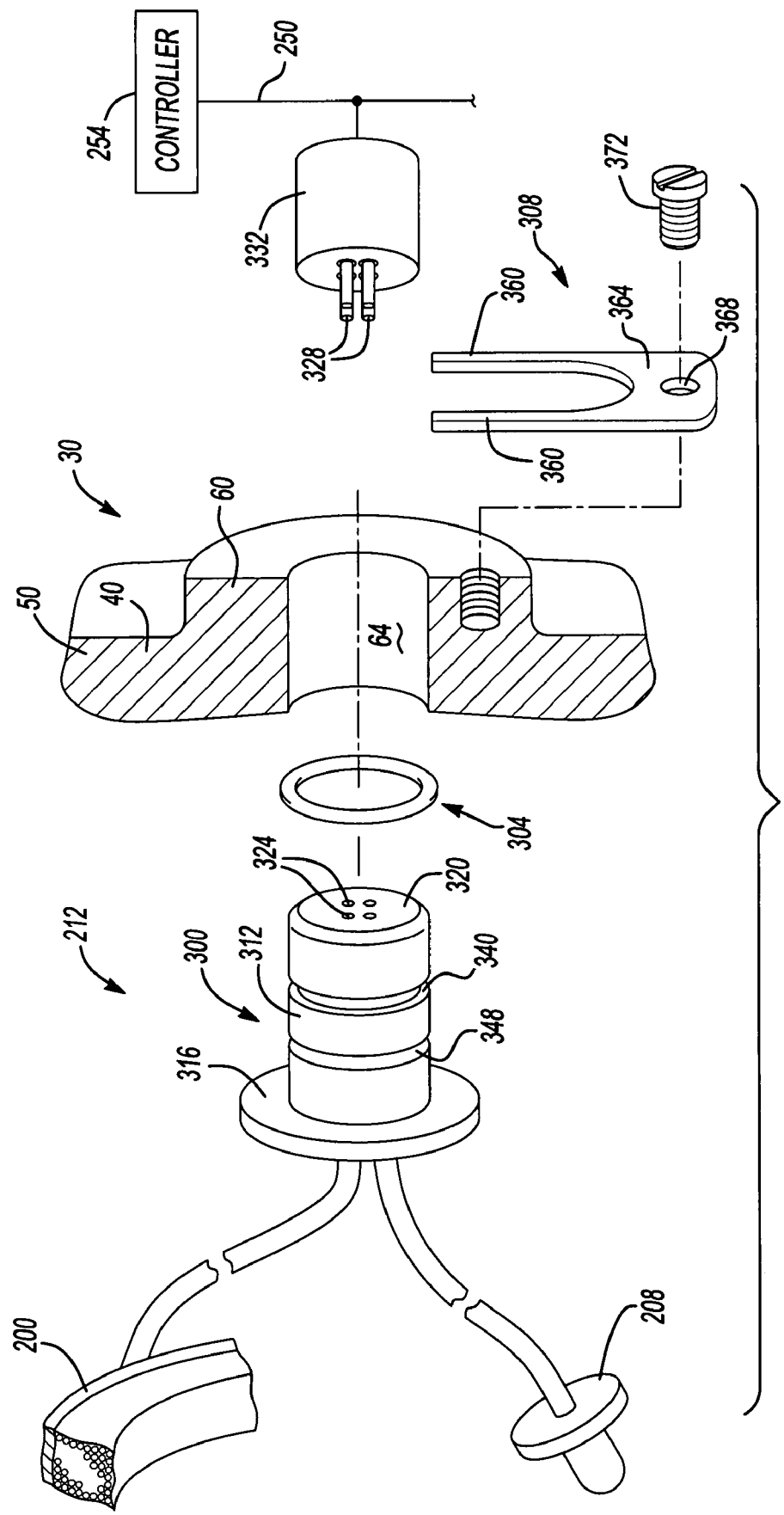
FIG. 4 is an exploded perspective view of a portion of the rear axle illustrating a portion of the electronic locking differential and the bulkhead connector.

With reference to FIG. 4, the bulkhead connector 212 is electrically interconnected to the coil 200 and the sensor 208 and facilitates the electrical interconnection of the coil 200 and the sensor 208 with a wire harness 250 that is external to the differential assembly 30. As those of ordinary skill in the art will appreciate from this disclosure, the wire harness 250 electrically couples the coil 200 and the sensor 208 to an associated controller 254 to permit the controller 254 to selectively control the coil 200 and to receive the sensor signal produced by the sensor 208. In the example provided, the bulkhead connector 212 includes a fitting 300, at least one seal 304 and a locking member 308.

The fitting 300 may include a body portion 312 and a flange 316. The body portion 312 is sized so as to be received through a through-hole 64 that is formed in the housing 40 of the differential assembly 30. The through-hole 64 is illustrated to be formed through a dedicated boss 60, but may alternatively be formed through any portion of the wall member 50 having sufficient thickness to ensure both sealing and engagement, as will be discussed in greater detail, below.

In the particular example provided, the body portion 312 is generally cylindrically shaped, having a connector end 320 with a plurality of terminals 324 that are configured to be engaged with the terminals 328 in a mating connector 332 on the wire harness 250. The connector end 320 and mating connector 332 may be keyed to one another in a conventional and well known manner to guide the terminals 324 and 328 into engagement with one another and/or to only permit the connector end 320 and mating connector 332 to be coupled to one another in a specific orientation, or the connector end 320 and mating connector 332 may be keyed about the body portion 312.

With renewed reference to FIG. 4, the body portion 312 of the fitting 300 also includes a retainer groove 340 and an optional seal groove 348. The retainer groove 340 may extend around the entire perimeter of the body portion 312 as is shown in FIG. 6, or may be configured to inhibit rotation of the body portion 312 relative to the housing 40 if rotation of the fitting 300 subsequent to the installation of the bulkhead connector 212 to the differential assembly 30 is disadvantageous. As one of ordinary skill in the art can appreciate, rotation of the body portion 312 can be inhibited in numerous different ways, including forming the retainer groove 340 about only a portion of the perimeter of the body portion 312 as shown in FIG. 6A, by forming the retainer groove 340 in two or more discrete sections (e.g., on opposite sides of the body portion 312) or by forming the body portion 312 in such a way that it matingly engages the base portion 364 of the locking member 308 when the legs 360 of the locking member 308 are disposed in the retainer groove 340. It can be appreciated, too, that the retainer groove 340 need not be of a uniform depth about any portion of the body portion 312 and as such, the retainer groove 340 can be formed in whole or in part by any means, including flats.

The seal groove 348 is formed about the perimeter of the body portion 312 on a side of the retainer groove 340 opposite the connector end 320 and has a shape that is complementary to that of the seal 304. In the particular example provided, the seal 304 is a conventional O-ring and as such, the seal groove 348 has a semi-circular shape. As those of ordinary skill in the art will appreciate from this disclosure, employment of the seal groove 348 operably retains the seal 304 in a predetermined location relative to the retainer groove 340 along the length of the body portion 312.

The flange 316 is relatively larger in diameter than the body portion 312 and as such, prevents the fitting from being pushed completely through the housing 40 of the differential assembly 30 during the installation of the bulkhead connector 212. The flange 316 tends to shield the through-hole 64 from lubricant that is splashed about the interior of the housing 40 and also cooperates with the housing 40 to form a labyrinth 356 (FIG. 5) that renders the infiltration of the lubricant into the through-hole 64 relatively difficult.

As noted above, the locking member 308 is employed to fixedly but removably retain the fitting 300 to the housing 40. In the particular embodiment illustrated, the locking member 308 is a generally U-shaped structure, having a pair of legs 360 that are spaced apart from one another by a base portion 364. With additional reference to FIG. 6, the legs 360 are configured to slidably engage the retainer groove 340 in the body portion 312 of the fitting 300. The base portion 364 may also engage a flat on the retainer groove 340 as is shown in FIG. 6A. Also, with reference to FIGS. 6 and 6A, the base portion 364 includes a through-hole 368 that permits a threaded fastener 372 to be received threrethrough; the threaded fastener 372 is threadably engaged to the housing 40 to thereby fixedly but removably couple the locking member 308 to the housing 40. Engagement of the locking member 308 to the retainer groove 340 in conjunction with the coupling of the locking member 308 to the housing 40 effectively inhibits movement of the fitting 300 within the through-hole 64. Thereafter, the connector end 320 may be electrically coupled to the mating connector 332 to thereby electrically couple the coil 200 and the sensor 208 to the wire harness 250.

While the bulkhead connector 212 has been described thus far as being employed for coupling the coil and sensor of an electronic locking differential to a wire harness, those skilled in the art will appreciate that the invention, in its broader aspects, may also be employed in conjunction with various other types of power transmitting devices including power take-offs, front differentials, transfer cases and transmissions, to permit electrical components, such as sensors and actuators, contained therein to be coupled to a wire harness.

Furthermore, although the bulkhead connector 212 has been described thus far as having a fitting 300 with a single seal 304 that is retained in a seal groove 348 and which seals about the perimeter of the body portion 312 and a locking member 308 that is fixedly coupled to the housing 40 of the differential assembly 30, those skilled in the art will appreciate that the invention, in its broader aspects, may be constructed somewhat differently. For example, the bulkhead connector 212 may employ a pair of seals 304 and 304a as shown in FIG. 7. In this arrangement, the seal 304a is coupled to the body portion 312 of the fitting 300 and configured to sealing engage the flange 316 and a counter-bored surfaces 400 on the interior of the housing 40a of the differential assembly 30a. As those skilled in the art will appreciate, the seal 304 and corresponding seal groove 348 on the body portion 312 of the fitting 300 may optionally be omitted, so that only the seal 304a sealingly engages the housing 40b and the flange 316 as illustrated in FIG. 8.

Figure 9:
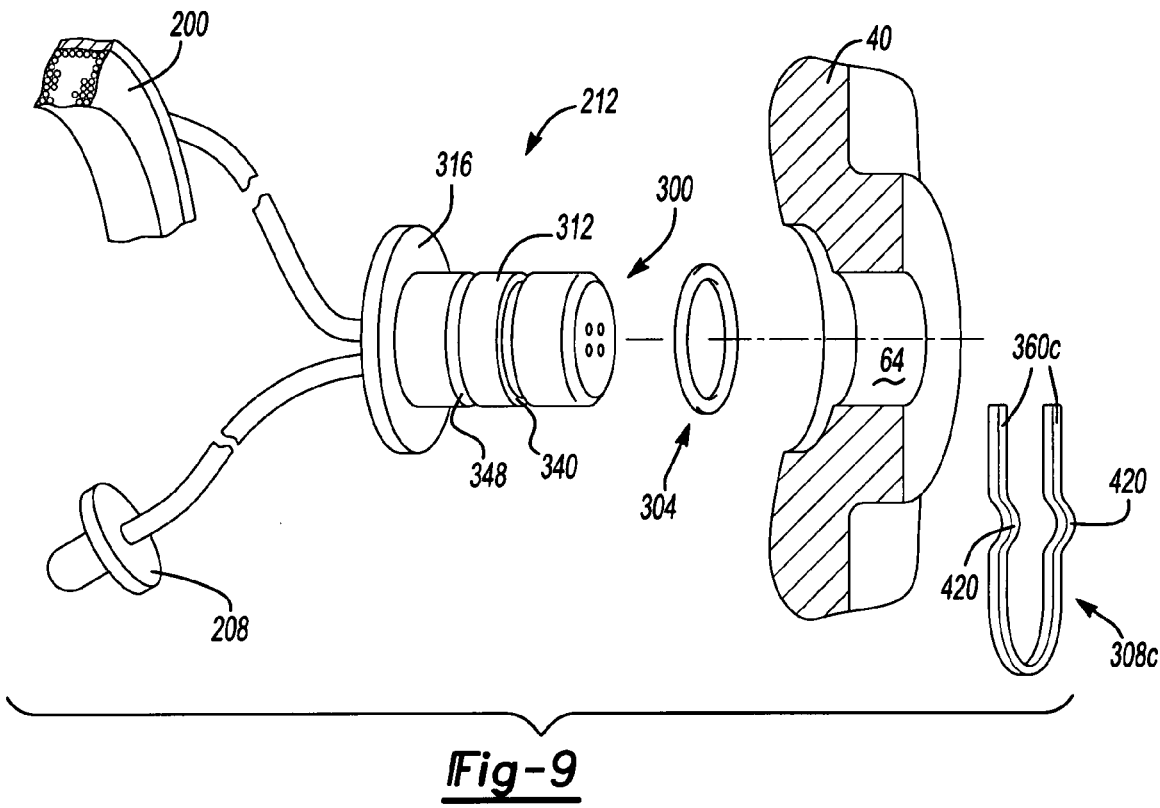
FIG. 9 is an exploded perspective view similar to that of FIG. 4, but illustrating an alternate locking member.
Figure 10:
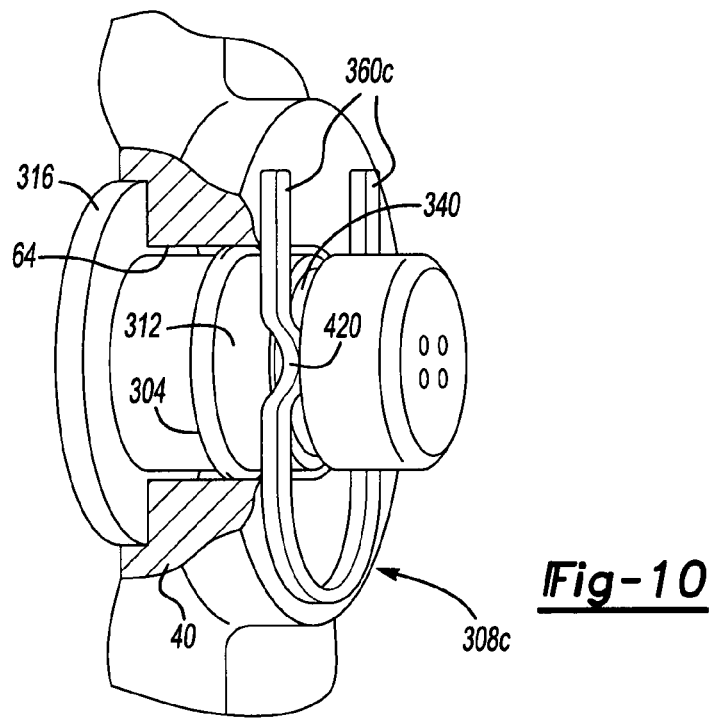
FIG. 10 is a partial sectional view of the bulkhead connector of FIG. 9 illustrating the bulkhead connector in the installed condition.

In the embodiment of FIGS. 9 and 10, the locking member 308c is illustrated to have legs 360c that each have a raised portion 420 that may be resiliently deflected relative to the remainder of the legs 360c. When the locking member 308c is engaged to the retainer groove 340, the raised portions 420 generate a biasing force that is exerted against the housing 40 and the body portion 312 of the fitting 300 which tends to pull the body portion 312 of the fitting 300 through the housing 40. In this embodiment, contact between the flange 316 and the housing 40 limits movement of the body portion 312 relative to the housing 40 so that the biasing force generated by the locking member 308c operably locks the fitting 300 to the housing 40.

While the locking member has been described thus far as being slidably engaged to the body portion of the fitting, those of ordinary skill in the art will appreciate from this disclosure that the locking member may be otherwise configured. For example, the locking member may be a conventional external snap ring.

While the invention has been described in the specification and illustrated in the drawings with reference to various embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the foregoing description and the appended claims.

What is claimed is:

1. A power transmitting device comprising:
    a housing defining an internal chamber and a hole communicating with said chamber;
    a rotary input member;
    a rotary output member;
    a gearset disposed within said chamber and operable for transmitting rotary power from said input member to said output member;
    an electrical component disposed in said chamber;
    a wiring harness disposed outside of said housing; and
    a connector assembly for providing an electrical connection between said electrical component and said wiring harness, said connector assembly including a fitting member, a seal member and a locking member, said fitting member electrically connected to said electrical component and having a body and a flange surrounding said body, said body extending through said hole such that its end portion extends beyond an outer wall surface of said housing and said flange is located in proximity to an inner wall surface of said housing, said seal member is disposed between said fitting member and said housing to form a sealed interface therebetween, and said locking member engages said end portion of said body to secure said fitting member to said housing.

2. The power transmitting device of claim 1 wherein said end portion of said body includes electrical terminals adapted for mating with electrical terminals on said wiring harness.

3. The power transmitting device of claim 1 wherein said seal member is disposed between said flange of said fitting member and said inner wall surface of said housing.

4. The power transmitting device of claim 1 wherein said flange is seated in a counterbore formed in said inner wall surface of said housing and which communicates with said hole.

5. The power transmitting device of claim 1 where in said body includes a groove within which said seal member is seated so as to provide said sealed interface between said fitting member and said housing within said hole.

6. The power transmitting device of claim 5 where in said body includes a second groove formed in its end portion within which said locking member is retained.

7. The power transmitting device of claim 6 wherein said locking member is a U-shaped components having first and second legs operable to engage said second groove for securing said fitting member to said housing.

8. The power transmitting device of claim 7 wherein said locking member further includes a base interconnecting said first and second legs, and wherein a fastener secures said base to said outer wall surface of said housing.

9. The power transmitting device of claim 6 wherein one of said locking member and said second groove include an anti-rotation mechanism for preventing said locking member from rotating relative to said fitting member.

10. The power transmitting device of claim 1 wherein said gearset is a differential with said rotary output member defining a pair of output shafts, and wherein said electrical component is an electrical actuator operable to releaseably engage said differential.

11. The power transmitting device of claim 10 further including a second electrical component defined as an electric sensor for detecting the rotary speed of said differential or one of said output shafts, and wherein said connector assembly provides electrical connection between said actuator and said sensor with said wiring harness.

12. The power transmitting device of claim 1 wherein said gearset is a differential and said rotary output member defines an output shaft driven by said differential, and wherein said electrical component is a sensor operable to detect the rotary speed of said differential or said output shaft.

13. An axle assembly, comprising:
an axle housing defining an internal chamber;
a pinion shaft having a pinion gear;
first and second axleshafts;
a differential rotatably supported in said chamber and having a casing driven by a ring gear meshed with said pinion gear, first and second side gears driving said first and second axleshafts, and differential gears for transferring rotary power from said casing to said axleshafts while permitting speed differentiation therebetween;
a limiting mechanism for selectively limiting relative rotation between said casing and one of said side gears;
an electrical actuator operable to actuate said limiting mechanism;
an electric sensor for detecting the rotary speed of one of said casing and said first and second axleshafts;

a control system for receiving electrical sensor signals from said sensor and supplying electrical control signals to said actuator, said control system including a controller and a wiring harness in electrical connection with said controller; and a connector assembly for providing an electrical connection between said actuator and said sensor and said wiring harness, said connector assembly including a fitting member and a locking member, said fitting member is electrically connected to said actuator and said sensor and has a body and a flange surrounding said body, said body extending through a hole in said axle housing such that its end portion extends beyond an outer wall surface of said axle housing and said flange is located in proximity to an inner wall surface of said axle housing, said locking member engages said end portion of said body to secure said fitting member to said axle housing.

14. The axle assembly of claim 13 wherein said end portion of said body includes electrical terminals adapted for mating with electrical terminals on said wiring harness.

15. The axle assembly of claim 13 wherein a seal is disposed between said flange of said fitting member and said inner wall surface of said axle housing.

16. The axle assembly of claim 13 where in said body includes a groove within which a seal is seated so as to provide a sealed interface between said fitting member and said axle housing within said hole.

17. The axle assembly of claim 16 where in said body includes a second groove formed in its end portion within which said locking member is retained.

18. The axle assembly of claim 17 wherein said locking member is a U-shaped components having first and second legs operable to engage said second groove for securing said fitting member to said axle housing.

19. The axle assembly of claim 18 wherein said locking member further includes a base interconnecting said first and second legs, and wherein a fastener secures said base to said outer wall surface of said axle housing.

20. The axle assembly of claim 16 wherein one of said locking member and said second groove include an anti-rotation mechanism for preventing said locking member from rotating relative to said fitting member.

21. A power transmitting device, comprising:
a housing having an internal chamber and a wall defining an inner wall surface and an outer wall surface with a hole the rebetween;
an input member rotatably supported by said housing;
an output member rotatably supported by said housing;
a torque transfer unit disposed in said chamber for transferring drive torque from said input member to said output member
an electrical component disposed in said chamber;
a wiring harness disposed outside of said housing; and
a connector assembly for providing an electrical connection between said electrical component and said wiring harness, said connector assembly including a fitting member, a seal member and a locking member, said fitting member is electrically connected to said electrical component and has a body and a flange surrounding said body, said body extending through said hole such that its end portion extends beyond said outer wall surface of said housing and said flange is located in proximity to said inner wall surface of said housing, said seal member is disposed between said fitting member and said housing to form a sealed interface therebetween, and said locking member engages said end portion of said body to secure said fitting member to said housing.

22. The power transmitting device of claim 21 wherein said end portion of said body includes electrical terminals adapted for mating with electrical terminals on said wiring harness.

23. The power transmitting device of claim 21 wherein said seal member is disposed between said flange of said fitting member and said inner wall surface of said housing.

24. The power transmitting device of claim 21 wherein said flange is seated in a counterbore formed in said inner wall surface of said housing and which communicates with said hole.

25. The power transmitting device of claim 21 wherein said body includes a groove within which said seal member is seated.

26. The power transmitting device of claim 25 where in said body includes a second groove formed in its end portion within which said locking member is retained.

27. The power transmitting device of claim 26 wherein said locking member is a U-shaped components having first and second legs operable to engage said second groove for securing said fitting member to said housing.

28. The power transmitting device of claim 27 wherein said locking member further includes a base interconnecting said first and second legs, and wherein a fastener secures said base to said outer wall surface of said housing.

29. The power transmitting device of claim 25 wherein one of said locking member and said second groove include an anti-rotation mechanism for preventing said locking member from rotating relative to said fitting member.

* * * * *